United States Patent [19]

Neece

[11] Patent Number: 5,723,816
[45] Date of Patent: Mar. 3, 1998

[54] PAINT SHIELDS FOR ELECTRICAL SWITCHES AND OUTLETS

[76] Inventor: James Neece, 5325 Coal Mine Rd., Ione, Calif. 95640

[21] Appl. No.: 694,212

[22] Filed: Aug. 8, 1996

[51] Int. Cl.⁶ .................................................. H02G 3/100
[52] U.S. Cl. ..................................... 174/66; 174/67
[58] Field of Search ........................ 174/66, 67; 220/3.8

[56] References Cited

U.S. PATENT DOCUMENTS 3,840,692  10/1974  Wells ............................... 174/66
5,375,728  12/1994  West ............................... 220/3.8

Primary Examiner—Kristine L. Kincaid
Assistant Examiner—Joseph Waks

[57] ABSTRACT

A paint shield for electrical switches and outlets for covering an electrical outlet or light switch when the face plate is removed during painting of the wall thereby preventing paint from leaking into the socket. The inventive device includes a rectangular plate which includes a switch aperture, a right flexible clip and a left flexible clip which clamp to a light switch mesial, and a rubber arcuate cover surrounding the switch aperture.

2 Claims, 3 Drawing Sheets

PAINT SHIELDS FOR ELECTRICAL SWITCHES AND OUTLETS

BACKGROUND OF THE INVENTION

1. Field of the Invention

The present invention relates to Electrical Cover Devices and more particularly pertains to a new paint shields for electrical switches and outlets for covering an electrical outlet or light switch when the face plate is removed during painting of the wall thereby preventing paint from leaking into the socket.

2. Description of the Prior Art

The use of Electrical Cover Devices is known in the prior art. More specifically, Electrical Cover Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Electrical Cover Devices include U.S. Pat. No. 5,063,872; U.S. Pat. No. 5,003,128; U.S. Design Pat. No. 297,396; U.S. Pat. No. 5,285,014; U.S. Design Pat. No. 279,860 and U.S. Design Pat. No. 349,836.

While these devices fulfill their respective, particular objectives and requirements, the aforementioned patents do not disclose a new paint shields for electrical switches and outlets. The inventive device includes a rectangular plate which includes a switch aperture, a right flexible clip and a left flexible clip which clamp to a light switch mesial, and a rubber arcuate cover surrounding the switch aperture.

In these respects, the paint shields for electrical switches and outlets according to the present invention substantially departs from the conventional concepts and designs of the prior art, and in so doing provides an apparatus primarily developed for the purpose of covering an electrical outlet or light switch when the face plate is removed during painting of the wall thereby preventing paint from leaking into the socket.

SUMMARY OF THE INVENTION

In view of the foregoing disadvantages inherent in the known types of Electrical Cover Devices now present in the prior art, the present invention provides a new paint shields for electrical switches and outlets construction wherein the same can be utilized for covering an electrical outlet or light switch when the face plate is removed during painting of the wall thereby preventing paint from leaking into the socket.

The general purpose of the present invention, which will be described subsequently in greater detail, is to provide a new paint shields for electrical switches and outlets apparatus and method which has many of the advantages of the Electrical Cover Devices mentioned heretofore and many novel features that result in a new paint shields for electrical switches and outlets which is not anticipated, rendered obvious, suggested, or even implied by any of the prior art Electrical Cover Devices, either alone or in any combination thereof.

To attain this, the present invention generally comprises a rectangular plate which includes a switch aperture, a right flexible clip and a left flexible clip which clamp to a light switch mesial, and a rubber arcuate cover surrounding the switch aperture.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new paint shields for electrical switches and outlets apparatus and method which has many of the advantages of the Electrical Cover Devices mentioned heretofore and many novel features that result in a new paint shields for electrical switches and outlets which is not anticipated, rendered obvious, suggested, or even implied by any of the prior art Electrical Cover Devices, either alone or in any combination thereof.

It is another object of the present invention to provide a new paint shields for electrical switches and outlets which may be easily and efficiently manufactured and marketed.

It is a further object of the present invention to provide a new paint shields for electrical switches and outlets which is of a durable and reliable construction.

An even further object of the present invention is to provide a new paint shields for electrical switches and outlets which is susceptible of a low cost of manufacture with regard to both materials and labor, and which accordingly is then susceptible of low prices of sale to the consuming public, thereby making such paint shields for electrical switches and outlets economically available to the buying public.

Still yet another object of the present invention is to provide a new paint shields for electrical switches and outlets which provides in the apparatuses and methods of the prior art some of the advantages thereof, while simultaneously overcoming some of the disadvantages normally associated therewith.

Still another object of the present invention is to provide a new paint shields for electrical switches and outlets for covering an electrical outlet or light switch when the face plate is removed during painting of the wall thereby preventing paint from leaking into the socket.

Yet another object of the present invention is to provide a new paint shields for electrical switches and outlets which includes a rectangular plate which includes a switch aperture, a right flexible clip and a left flexible clip which clamp to a light switch mesial, and a rubber arcuate cover surrounding the switch aperture.

Still yet another object of the present invention is to provide a new paint shields for electrical switches and outlets that keeps paint and other debris from collecting within the electrical outlet and the light switch sockets during painting when the cover plates are removed.

Even still another object of the present invention is to provide a new paint shields for electrical switches and outlets that improves the quality of a paint job and allows the paint job to be done faster.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
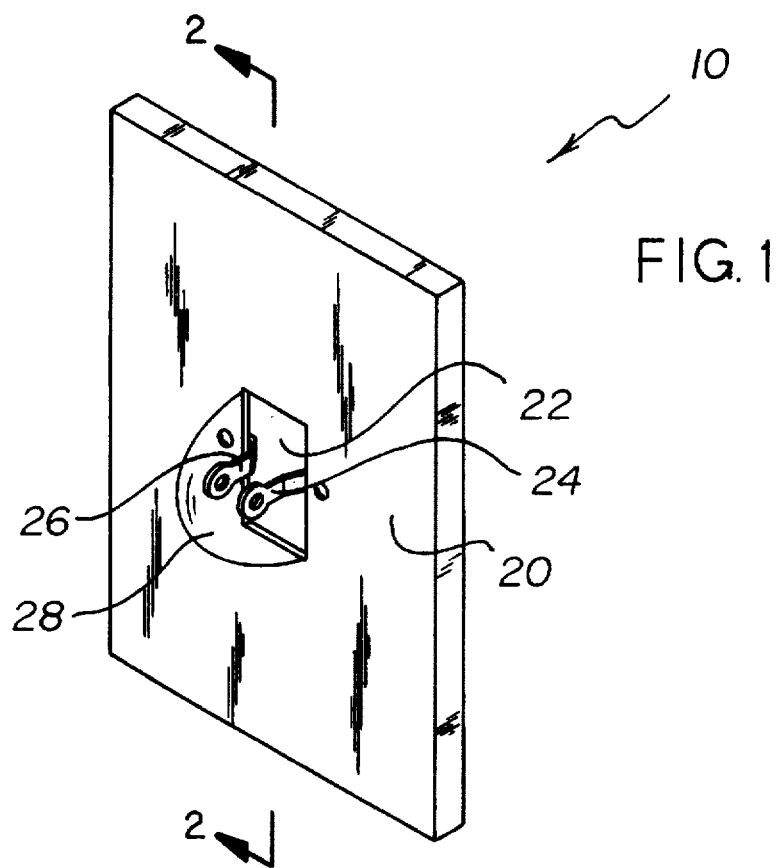
FIG. 1 is a right side perspective view of a new paint shields for electrical switches and outlets which covers a light switch according to the present invention.

With reference now to the drawings, and in particular to FIGS. 1 through 6 thereof, a new paint shields for electrical switches and outlets embodying the principles and concepts of the present invention and generally designated by the reference numeral 10 will be described.

Figure 2:
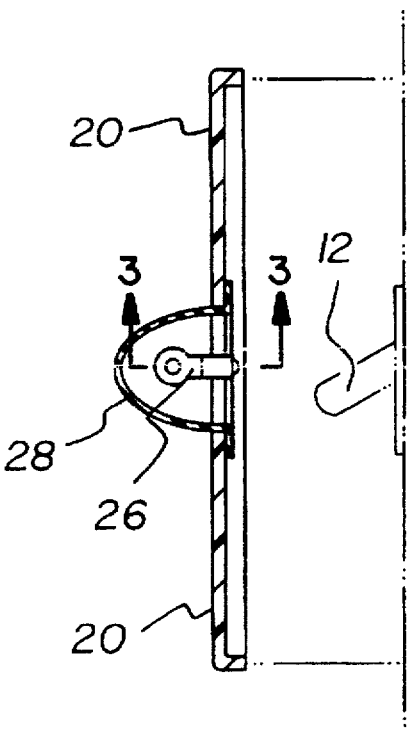
FIG. 2 is a cross sectional view taken along line 2—2 of FIG. 1.
Figure 3:
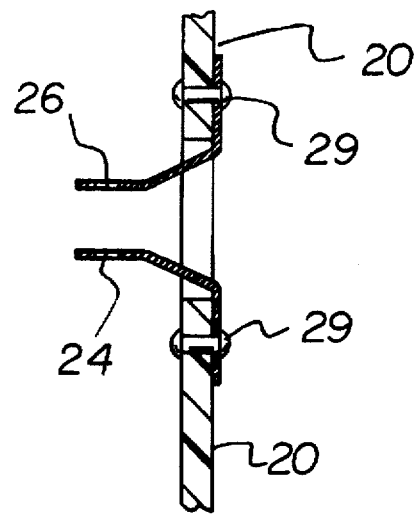
FIG. 3 is a cross sectional view taken along line 3—3 of FIG. 2.

More specifically, it will be noted that the paint shields for electrical switches and outlets 10 comprises a rectangular plate 20 formed to the shape of an electrical outlet 14, swaged and constructed from a non-conductive material. As best illustrated in FIGS. 1 through 3, it can be shown that the rectangular plate 20 includes a switch aperture 22 which receives a light switch 12. A right flexible clip 24 is secured to the rear surface of the rectangular plate 20 by a fastener 29 near the switch aperture 22 and projects through the switch aperture 22 orthogonally to the front surface of the rectangular plate 20 as shown in FIG. 3 of the drawings. A left flexible clip 26 is secured to the rear surface of the rectangular plate 20 by another fastener 29 near the switch aperture 22 and projects through the switch aperture 22 orthogonally to the front surface of the rectangular plate 20 parallel to the right flexible clip 24. The right and left flexible clips 24, 26 frictionally capture the light switch 12 thereby retaining the rectangular plate 20 juxtaposed to the socket thereby preventing paint or other debris from entering. As shown in FIGS. 1 and 2 of the drawings, a rubber arcuate cover 28 is secured to the front surface of the rectangular plate 20 completely encompassing the switch aperture 22. The rubber arcuate cover 28 is formed to allow the projection of the light switch 12.

Figure 4:
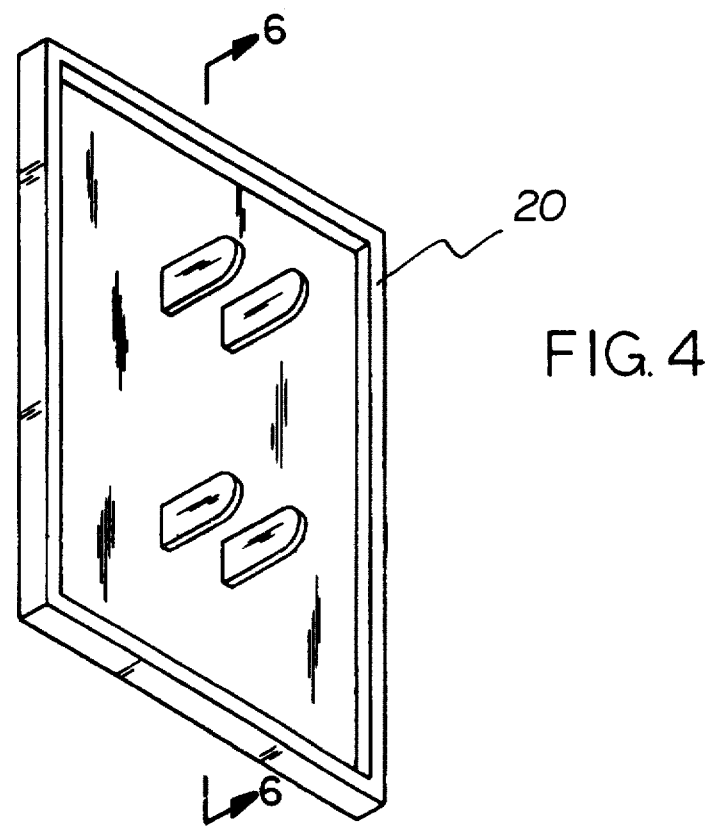
FIG. 4 is a rear perspective view of an alternative embodiment which covers an electrical outlet.
Figure 5:
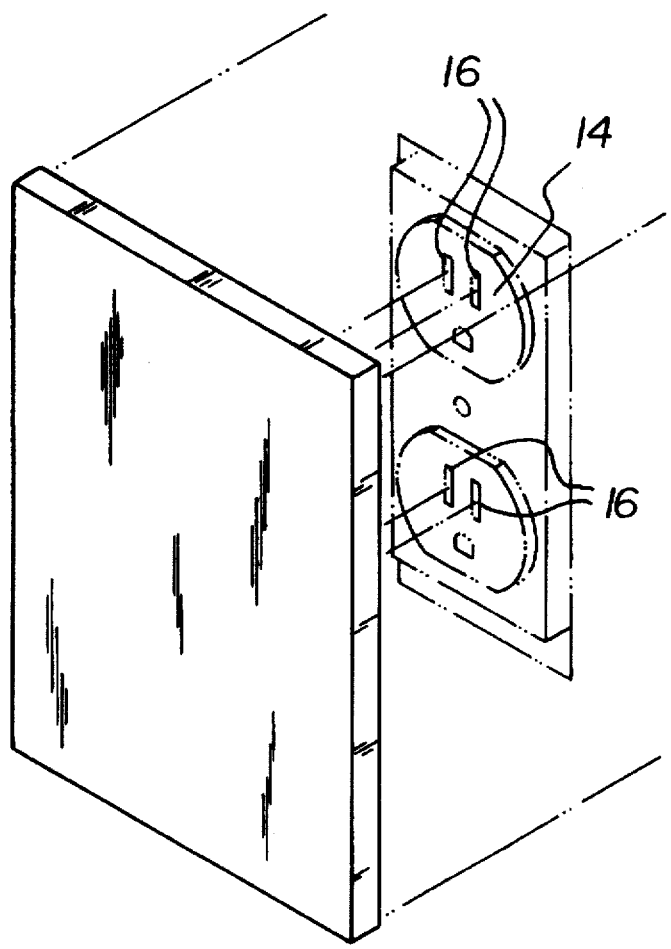
FIG. 5 is a front perspective view of the alternative embodiment.
Figure 6:
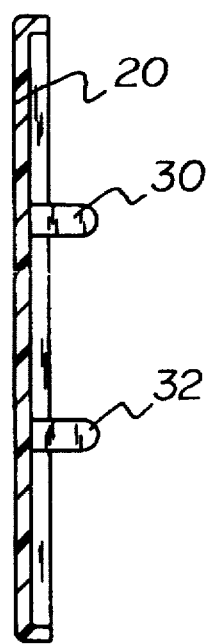
FIG. 6 is a cross sectional view taken along line 6—6 of FIG. 4.

In an alternative embodiment as shown in FIGS. 4 through 6 of the drawings, a rectangular plate 20 formed to the shape of an electrical outlet 14, swaged and constructed from a non-conductive material. The rectangular plate 20 includes a pair of upper male prongs 30 secured orthogonally to the upper portion of the rear surface as best shown in FIG. 4 of the drawings. The upper male prongs 30 project into a pair of female electrical receptacles 16 thereby retaining the rectangular plate 20 juxtaposed to the socket to prevent paint from entering an electrical outlet 14. The rectangular plate 20 includes a pair of lower male prongs 32 secured orthogonally to the lower portion of the rear surface below the upper male prongs 30. The lower male prongs 32 project into a lower pair of female electrical receptacles 16 thereby retaining the rectangular plate 20 juxtaposed to the socket to prevent paint from entering an electrical outlet 14.

In use, the user removes the cover plate of the light switch 12 or the electrical outlet 14. When covering a light switch 12, the user positions the right and left flexible clips 24, 26 around the light switch 12 thereby frictionally engaging the present invention to the light switch 12. The user then may paint around the present invention without accumulating any paint or other harmful debris within the light switch 12. The above procedure is repeated for electrical outlets 14 except the upper and lower male prongs 30, 32 project into the female electrical receptacles 16 of the electrical outlet 14. When the user is finished painting, they simply remove the present invention by grasping the present invention and apply a pulling force.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A paint shield for covering an electrical wall switch cover, comprising:

a rectangular plate of a size adapted for covering said electrical wall switch cover and being formed from a non-electrically conductive material, said rectangular plate having a switch lever aperture for receiving an electrical wall switch lever a right clip member secured to said rectangular plate adjacent to said switch lever aperture and projecting through said switch lever aperture in a substantially orthogonal orientation to said rectangular plate, and a left clip member secured to said rectangular plate adjacent to said switch lever aperture at a location opposite said right clip member said left clip member projecting through said switch lever aperture in a substantially orthogonal orientation to said rectangular plate, wherein the right and left clip members are able to pinchingly abut said switch lever to thereby retain the rectangular plate in a position over said wall switch cover to thereby prevent paint or other debris from contacting said wall switch cover.

2. The paint shield for covering an electrical wall switch cover of claim 1, wherein an elastomeric arcuate cover is secured to the rectangular plate around the switch lever aperture such that the elastomeric arcuate cover permits the projection of said switch lever through said aperture while protectively covering the switch lever.

* * * * *